W. AHLEN.
STEAM REGENERATOR.
APPLICATION FILED AUG. 2, 1911.
1,105,122. Patented July 28, 1914.
2 SHEETS—SHEET 1.
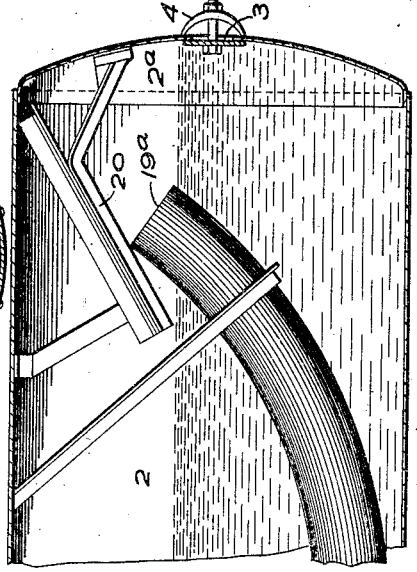
FIG. 1
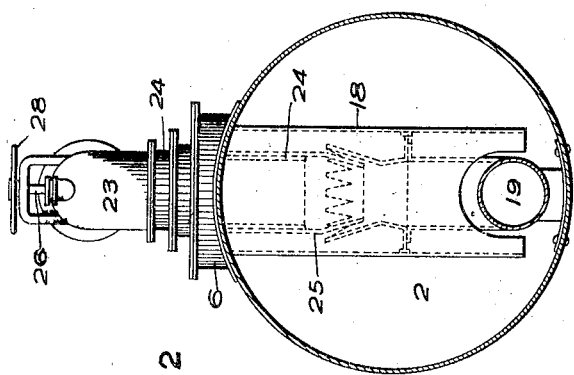
FIG. 2
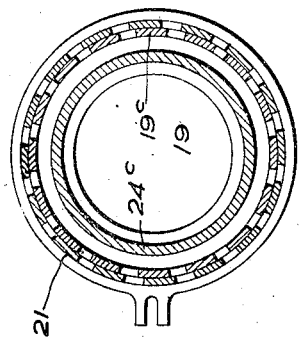
FIG. 6
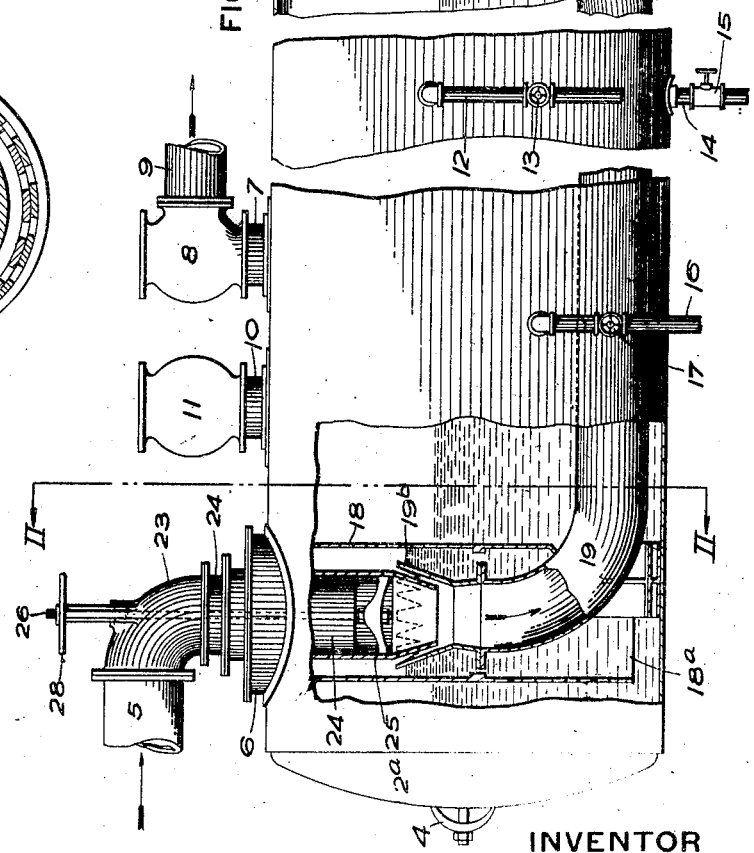
WITNESSES
R D Little
Chas Fosterman
INVENTOR
William Ahlen
by Linthicum Beets Fuller
his Attorneys

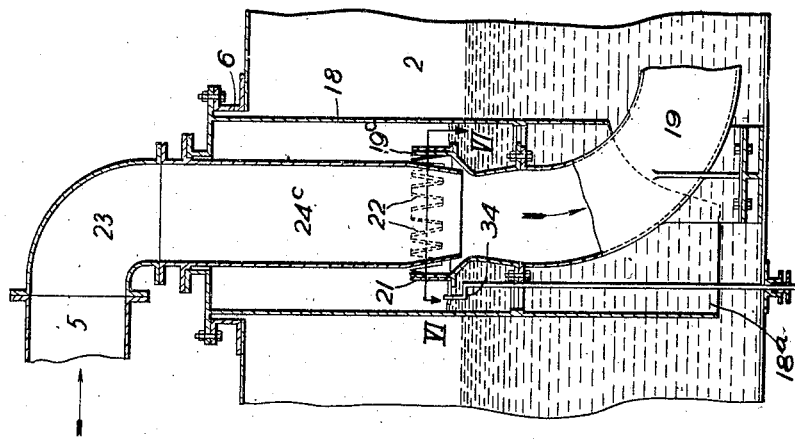
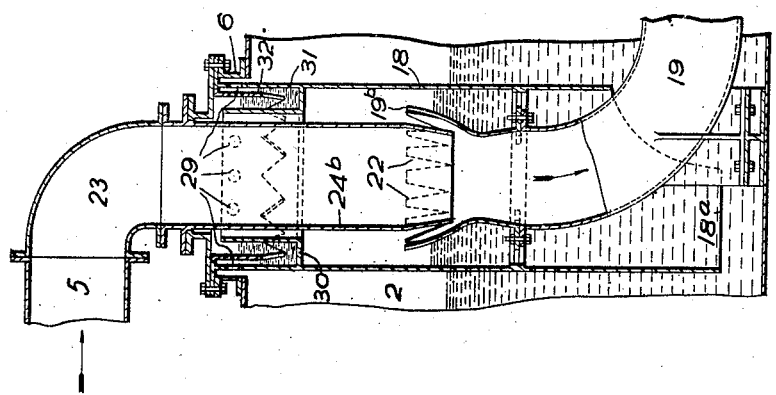
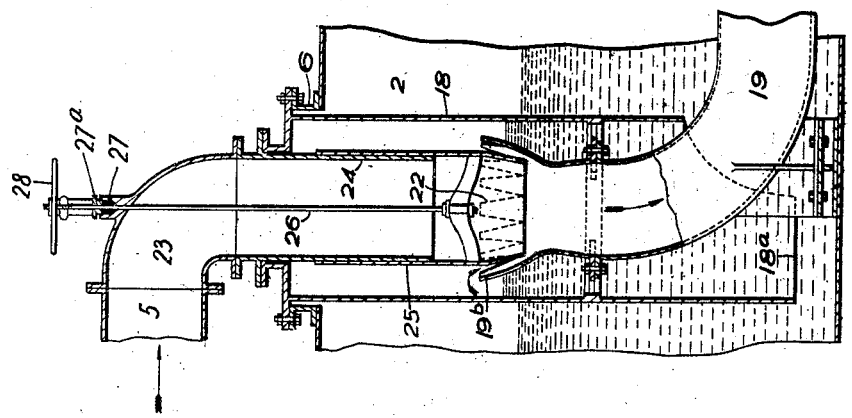

UNITED STATES PATENT OFFICE.

WILLIAM AHLEN, OF DUQUESNE, PENNSYLVANIA.

STEAM-REGENERATOR.

1,105,122.

Specification of Letters Patent.  Patented July 28, 1914.

Application filed August 2, 1911.  Serial No. 641,968.

*To all whom it may concern:*

Be it known that I, WILLIAM AHLEN, of Duquesne, in the county of Allegheny and State of Pennsylvania, have invented certain new and useful Improvements in Steam-Regenerators, of which the following is a full, clear, and exact description, reference being had to the accompanying drawings, forming part of this specification.

My invention relates to apparatus employed in storing the heat and conserving the energy of steam whereby an intermittent supply of steam or supply which varies in volume at different times is transformed into a regular and constant supply of low pressure steam of uniform volume, and the invention more particularly relates to the means employed in bringing the incoming steam into contact with the water or heat storing medium contained in the regenerator chamber.

With one form of regenerator used heretofore the incoming steam is caused to pass into and through a body of water. In another form of apparatus a regulated amount of water is withdrawn from the regenerator and is mixed in the form of spray with the steam, the resulting mixture of steam and water then being caused to again reënter or again pass into the regenerator chamber. With the first form of such apparatus considerable back pressure is caused in passing the steam into and through the body of water or heat storing medium in the regenerator and difficulty is had in bringing the steam and water into sufficiently intimate contact within the regenerator chamber. In the other type of regenerator the intermingling of the steam and water is regulated by means of mechanically operated valves of complicated construction which become easily disarranged and prove very expensive to maintain in operative condition and which cause frequent interruptions and delays in the operation of the regenerator in making necessary repairs and renewals.

One object of my invention is to provide a steam regenerator having novel means for mixing the in-flowing steam supply with the water in the regenerator whereby the steam is more intimately brought into contact with the water and greater efficiency in the transference of heat from the steam to the body of water is effected than has been possible with the apparatus known heretofore.

Another object of the invention is to provide a steam regenerator having improved means for automatically regulating and controlling the volume of water supplied to and mixed with the steam passing into and through the regenerator.

A further object of my invention is to provide apparatus for regenerating steam having improved means for mixing the steam and water whereby the water in the bottom or lower part of the regenerator (which contains the coldest water), is utilized to spray the steam and a more effective circulation of the body of water obtained, to the end that a more even temperature of steam and water is thereby secured and a greater interchange of heat is effected.

A still further object of this invention is to provide a steam regenerator having means whereby the vacuum or partial vacuum maintained within the vacuum chamber of the apparatus is automatically regulated and controlled and having improved means for automatically regulating and controlling the volume of water mixed with the steam in proper proportion with the varying amounts of steam entering the regenerator at different periods in the operation of the regenerator.

The invention consists in the novel construction and arrangement of parts hereinafter described and claimed.

Referring to the accompanying drawings forming part of this specification, Figure 1 is a side elevation partly in section showing a steam regenerator constructed and arranged in accordance with my invention. Fig. 2 is a transverse section taken on the line II—II of Fig. 1. Fig. 3 is a sectional elevation through the vacuum chamber or exhauster showing on an enlarged scale one form of mixing pipe constructed and arranged in accordance with this invention. Fig. 4 is a similar sectional elevation showing a modified form of vacuum chamber construction. Fig. 5 is a sectional elevation similar to those shown in Figs. 3 and 4 showing a further modification in the construction of the mixing pipe. Fig. 6 is a transverse section of the mixing pipe shown in Fig. 5, the section being taken on the line VI—VI of Fig. 5.

In the drawings, 2 designates a horizontal regenerator chamber, cylindrical in cross-section and having flanged heads $2^a$ closing its ends and in the heads forming the ends of the regenerator chamber are man-holes 3 which are normally closed by man-heads 4.

A steam supply pipe or main 5 which leads from the source of exhaust steam, such as a steam engine or series of such engines, communicates through the flanged branch pipe 6 with the vacuum chamber or exhauster located on the interior of the regenerator chamber 2.

A steam outlet is formed by the flanged branch pipe 7 secured on the regenerator chamber 2 which is connected through the angle valve 8 to a steam outlet pipe or main 9 leading to a steam turbine or other point of use for the regenerated steam passing from the regenerator. Another branch pipe 10 on the regenerator chamber 2 affords a convenient means for attaching a free exhaust outlet or relief valve 11 to the regenerator. (Such valves being old and well known are not further described other than in stating any of the several known forms of such devices may be employed.)

An overflow outlet pipe 12 is connected into the chamber 2 to maintain water or other liquid employed as the heat storage medium at the desired level within the chamber 2, a valve 13 on this overflow pipe serving to regulate and control the rate of overflow and in case of necessity entirely close the overflow outlet opening. A drain pipe 14 having a valve 15 is provided on the bottom of the regenerator to afford means for draining the regenerator chamber 2 and a water inlet pipe 16 having a valve 17 also is provided to supply water (preferably hot) to the regenerator chamber when starting the apparatus in operation or such other time found necessary or desirable.

Depending from the top flange of the branch pipe 6 forming the steam inlet to the regenerator chamber 2 is a vertically extending pipe or cylinder 18 which forms the vacuum chamber or exhauster of the apparatus. As shown the lower end of the vacuum chamber 18 opens into or is in communication with the regenerator chamber 2 below the level of the body of water maintained in this chamber by the water overflow outlet, the vacuum chamber 18 having an open lower end 18ª terminating a short distance above the bottom of the regenerator chamber 2.

Secured in the bottom of the regenerator chamber so as to be submerged in the body of water therein is a mixing pipe 19 having its ends bent or curved upwardly so as to open into the regenerator chamber 2 at a point above the water level of the water overflow outlet. The discharge end 19ª of this mixing pipe 19 is arranged to discharge against a baffle or deflector 20 which is secured in the regenerator at one end thereof to arrest and change the direcion of flow of the mixture of steam and water passed through the pipe 18 when the apparatus is in operation.

The steam inlet end 19ᵇ of the mixing pipe 19 is frusto-conical or enlarged as shown in Figs. 1, 2, 3 and 4, this pipe flaring or tapering upwardly and outwardly. As shown in Figs. 5 and 6, the enlarged end of this pipe has a concentric portion 19ᶜ with a rotatable ring or collar 21 rotatably secured thereon. The upper edge of the enlarged end 19ᵇ or 19ᶜ of the mixing pipe 19 is provided with a series of V-shaped notches or serrations 22, the bottom of these serrations being located at or slightly above the water level maintained in the regenerator chamber 2 by the water overflow outlet.

In the construction shown in Figs. 1, 2 and 3, the steam inlet main 5 is connected by an elbow 23 with a vertical pipe 24 which extends downwardly for some distance within the vacuum chamber or exhauster 18 and a vertically adjustable sliding pipe 25 is telescoped over the lower end of the depending pipe 24. The pipe 25 is suspended from a screw threaded pipe adjusting rod 26, the upper end of which extends through the stuffing box 27 and gland 27ª on the elbow 23 and the screw threaded portion of the upper end of the rod 26 passes through the internally threaded hub of the hand wheel 28 to enable the telescopic pipe 25 being adjusted vertically. The telescopic pipe is adjusted vertically to bring its lower frustoconical end into the desired position relative to the serrated upper end 19ᵇ of the submerged mixing pipe 19, to vary the size of the annular opening formed between the ends of these pipes 19 and 25. By adjusting the size of this annular opening the volume of water flowing into the serrated end of the pipe 19 is regulated and controlled and is made proportional to the volume of steam passing into the regenerator, the partial vacuum created and maintained in the vacuum chamber also varying with a change in volume of the incoming steam supply passing through the mixing pipe. By regulating the size of the annular opening connecting the vacuum chamber with the mixing pipe to suit the maximum flow of steam passing into the regenerator, a sufficient partial vacuum will be maintained within the vacuum chamber to supply the maximum volume of water necessary to be admitted into the mixing pipe 19 with the maximum amount of steam. The serrations in the end 19ᵇ of the pipe 19 are of such shape that any decrease in the flow of steam into the regenerator will lessen the amount of the partial vacuum in the vacuum chamber, and the vacuum will be reduced to an extent which will automatically cause a proportionately smaller amount of water to be supplied to and enter the mixing pipe 19. The automatic regulation of the volume of water supplied to the mixing pipe causes water to be supplied to the steam entering the pipe 19 in proportion to the volume of entering steam.

In the modified construction shown in Fig. 4 a cylinder or pipe depends from the branch pipe 6 on the regenerator to form the vacuum chamber or exhauster 18 and a stationary pipe $24^b$ extends downwardly from and connects the elbow 5 on the steam supply main with the mixing pipe 19. The lower end of the pipe $24^b$ is frusto-conical and projects into the open enlarged and serrated upper end $19^b$ of the mixing pipe 19 so as to form an annular opening connecting the mixing pipe 19 with the interior of the vacuum chamber 18. Holes or openings 29 in the upper end of the chamber 18 are provided to afford communication between the regenerator chamber 2 and vacuum chamber 18 and a flange 30 on the interior of the pipe 18 forms an annular trough 31 in the upper end of the pipe or chamber 18. A depending flange 32 having notches or serrations on its lower end extends into the annular trough 31 to form a water seal for a purpose described hereinafter.

In the construction shown in Figs. 5 and 6 the inlet pipe has a depending portion $24^c$ which extends downwardly from the elbow 23 on the steam supply main into the upper serrated end $19^b$ of the mixing pipe 19 in a manner similar to that shown in Fig. 4. The upper serrated edge $19^c$ of the pipe 19 is provided with a ring or collar 21 also having notches or serrations of similar size and shape to those on the serrated edge $19^b$ of the pipe 19. The collar 21 is rotatable relatively to the pipe $24^c$, a crank connection 34 extending through the shell of the regenerator 2 being provided with a lever 25 by which the ring or collar 21 is moved on the end $19^c$ of the pipe 19 so as to vary the size of the V-shaped serrations formed by the adjacent edges of the ring 21 and pipe $19^c$, in this way changing the size of the V-shaped serrations and thereby regulating the flow of water admitted into the mixing pipe 19.

The operation of the apparatus is as follows:—The regenerator chamber 2 is filled with water which preferably is hot, to about the level of the water overflow outlet connected to the overflow pipe 12. Exhaust steam from the source of steam supply is then conducted into the regenerator by means of the steam supply main 5, the steam passing through the depending pipe in the vacuum chamber or exhauster 18 into the inlet end $19^b$ of the submerged mixing pipe 19 and, emerging therefrom into the regenerator 2 above the level of the water overflow outlet, passes from the regenerator into the steam main 9 leading to the steam turbine or other point of use. For a short time after steam is first admitted to the regenerator, or following a period of inaction after an interruption in the operation of the apparatus due to lack of steam supply or other cause the incoming steam entering the regenerator chamber 2 from the mixing pipe 19 is practically unmixed with water. Within a short interval after the admission of steam to the regenerator chamber 2, the column of steam flowing through the mixing pipe 19 will cause a partial vacuum to be formed within the vacuum chamber or exhauster 18. After partial vacuum has been established in the vacuum chamber, the continued passage of steam through the pipe 19 will maintain the partial vacuum in the vacuum chamber and thereby cause the level of the water in the chamber 18 to rise above that in the main portion of the regenerator 2. When the level of the water in the vacuum chamber rises above the bottom of the serrated openings or slots in the end $19^b$ of the mixing pipe 19 the water flows from the vacuum chamber 18 in an annular sheet into the mixing pipe 19 and is injected into and intimately mixed with the incoming steam. The so-formed mixtures of steam and water pass through the pipe 19 and are discharged from the opposite end $19^a$ of this pipe into the regenerator 2, striking against the baffle or deflector 20 located adjacent to the outlet end $19^a$ of this pipe and thereby being directed downwardly in the regenerator chamber. The greater the quantity of steam admitted into or passed through the mixing pipe 19 the greater will be the degree of the partial vacuum maintained in the vacuum chamber or exhauster 18 and, owing to the increased vacuum raising or lifting the water to a higher level in the vacuum chamber the quantity of water flowing into the upper end $19^b$ of the pipe 19 will be increased. By adjusting the sliding pipe 25 of the construction shown in Figs. 1, 2 and 3 the area of the inlet opening from the vacuum chamber to this pipe is regulated and controlled and in this way the supply of water entering the mixing pipe 19 is made proportional to the volume of steam passing into the regenerator through this pipe.

In the construction shown in Fig. 4, the operation is as before. In this construction however, the annular flange 32 on the upper end of the vacuum chamber provides a water seal, the depending end of this flange extending downwardly into the water which is constantly supplied to the trough 31 to form a water seal, a sufficient amount of water being provided by condensation constantly being effected in the regenerator. The top of the vacuum chamber is connected by means of the openings or holes 29 with the interior of the regenerator chamber 2 through the water seal so that when the partial vacuum within the vacuum chamber reaches a certain limit the water in the outer portion of the water seal is lowered so as to allow steam from regenerator chamber to enter the vacuum chamber underneath the flange 32 and limit the degree of vacuum in this chamber. The upper edge of flange 30 forming the water seal is made of such height that excess water will overflow into the vacuum chamber.

With the construction shown in Figs. 5 and 6 the operation is the same as before described. In this construction the area of the annular opening between the lower end of the depending pipe 24ᶜ on the steam inlet elbow 23 and the serrated upper edge 19ᶜ of the curved mixing pipe 19 which is submerged within the regenerator is regulated by turning the ring or collar 33 on the upper end of the pipe and varying the size of the serrated openings 22 in the upper edge of this pipe.

The advantages of my invention will be appreciated by those skilled in the art. I believe myself to be the first to use an ejector or exhauster whereby the flow of steam into the regenerator draws the required amount of water out of a body of water maintained in the regenerator and mixes the incoming steam and water so as to transfer surplus heat from the steam to the water. Another advantage of my invention is to provide a regenerator having means whereby the regenerator is always in readiness for use after interruption in its operation due to lack of steam or for other reasons without delays in equalizing the temperature and pressure within the regenerator chamber.

I claim:—

1. A steam regenerator comprising a regenerator chamber having steam inlet and outlet openings and a water overflow outlet opening, a vacuum chamber surrounding the steam inlet and in communication with the regenerator chamber below the level of the water overflow outlet opening, and a mixing pipe in the regenerator chamber having end portions opening respectively into the regenerator and vacuum chambers above the level of the water overflow outlet opening.

2. A steam regenerator comprising a regenerator chamber having steam inlet and outlet openings and a water overflow outlet opening, a mixing pipe in said chamber extending below and having ends opening above the level of the water overflow outlet opening, and a vacuum chamber communicating with the regenerator chamber below the level of its water overflow outlet opening into which the steam inlet opening and inlet end of said mixing pipe extends.

3. A steam regenerator comprising a regenerator chamber having steam inlet and outlet openings and having a water overflow outlet opening, a vacuum chamber surrounding the steam inlet opening and having an open lower end extending below the level of said overflow outlet opening in the regenerator chamber, and a mixing pipe in the regenerator chamber below the level of the overflow outlet opening having end portions extending upwardly above the level of the water overflow outlet opening, the inlet end of said mixing pipe extending into proximity to and forming with the lower end of the steam inlet opening in the vacuum chamber an annular opening connecting the top of the vacuum chamber with the steam inlet and mixing pipes.

4. A steam regenerator comprising a regenerator chamber having steam inlet and outlet openings and having a water overflow outlet opening, a vacuum chamber surrounding the steam inlet opening and having an open lower end extending below the level of said overflow outlet opening in the regenerator chamber, and a mixing pipe in the regenerator chamber below the level of the overflow outlet opening having end portions extending upwardly above the level of the water overflow outlet opening, the inlet end of said mixing pipe extending into proximity to and forming with the lower end of the steam inlet opening in the vacuum chamber, an annular opening connecting the top of the vacuum chamber with the steam inlet and mixing pipes, and means for varying the size of the annular opening formed by the adjacent ends of the steam inlet and the mixing pipes.

5. A steam regenerator comprising a regenerator chamber having steam inlet and outlet openings and a water overflow outlet opening, a vacuum chamber surrounding the steam inlet and in communication with the regenerator chamber below the level of the water overflow outlet opening, and a mixing pipe in the regenerator chamber having a discharge end opening into the regenerator and an inlet end extending into and communicating with the vacuum chamber above the level of the water overflow outlet opening in the regenerator.

6. A steam regenerator comprising a regenerator chamber having steam inlet and outlet openings and an overflow outlet opening, a vacuum chamber surrounding the steam inlet opening and having an open lower end extending below the level of said overflow outlet opening, a mixing pipe in the regenerator chamber having end portions extending upwardly above the level of the overflow outlet opening, the inlet end of said mixing pipe extending into proximity to and forming with the lower end of the steam inlet opening an annular opening connecting the top of the vacuum chamber with the steam inlet and mixing pipe, and means for relatively adjusting the adjoining ends of said mixing pipe and steam inlet opening to vary the size of said annular opening.

7. A steam regenerator comprising a regenerator chamber having steam inlet and outlet openings and an overflow outlet opening, a vacuum chamber surrounding the steam inlet opening and having an open lower end extending below the level of said overflow outlet opening, a mixing pipe in the regenerator chamber having end portions extending upwardly above the level of the water overflow outlet opening, the inlet end of said mixing pipe extending into proximity to and forming with the lower end of the steam inlet opening an annular opening connecting the top of the vacuum chamber with the steam inlet and mixing pipe, and adjustable means for regulating the size of said annular opening.

8. A steam regenerator comprising a regenerator chamber having steam inlet and outlet openings and an overflow outlet opening, a vacuum chamber surrounding the steam inlet opening and having an open lower end extending below the level of said overflow outlet opening, a mixing pipe in the regenerator chamber having end portions extending upwardly above the level of the water overflow outlet opening, the inlet end of said mixing pipe extending into proximity to and forming with the lower end of the steam inlet opening an annular opening connecting the top of the vacuum chamber with the steam inlet and mixing pipe, and means for moving the lower end of said steam inlet opening to vary the size of said annular opening.

9. A steam regenerator comprising a regenerator chamber having steam inlet and outlet openings and a water overflow outlet opening, a mixing pipe within said chamber having imperforate walls and having ends opening above the level of the water overflow outlet, and means for lifting and delivering water from said regenerator chamber into the inlet end of the mixing pipe.

10. A steam regenerator comprising a regenerator chamber having steam inlet and outlet openings and a water overflow outlet opening, a mixing pipe within said chamber having ends opening above the level of the water overflow outlet and means for lifting and delivering water from said regenerator chamber into the inlet end of the mixing pipe.

In testimony whereof, I have hereunto set my hand.

WILLIAM AHLEN.

Witnesses:
  FRED GERDTS,
  ARTHUR MAINWARING.

---

Copies of this patent may be obtained for five cents each, by addressing the "Commissioner of Patents, Washington, D. C."